Nov. 5, 1935.  J. Q. HOLMES ET AL  2,019,814

FLUID OPERATED CHUCK

Original Filed Sept. 29, 1932   2 Sheets-Sheet 1

INVENTORS
John Q. Holmes and Leo C. Shippy
BY Spencer Hardman & Fehr
their ATTORNEYS.

Nov. 5, 1935.　　J. Q. HOLMES ET AL　　2,019,814
FLUID OPERATED CHUCK
Original Filed Sept. 29, 1932　2 Sheets-Sheet 2

INVENTORS
John Q. Holmes and Leo C. Shippy
BY
Spencer Hardman & Fehr
their ATTORNEYS.

Patented Nov. 5, 1935

2,019,814

UNITED STATES PATENT OFFICE 2,019,814

FLUID OPERATED CHUCK

John Q. Holmes, Anderson, Ind., and Leo C. Shippy, Lockport, N. Y., assignors to General Motors Corporation, Detroit, Mich., a corporation of Delaware Original application September 29, 1932, Serial No. 635,316. Divided and this application April 30, 1934, Serial No. 723,282

9 Claims. (Cl. 279—4)

The invention relates to chucks and more particularly to fluid pressure operated chucks.

It is among the objects of the present invention to provide fluid pressure means for operating a chuck in such manner that more power is exerted by said fluid pressure means to release the work than is exerted by the same to clamp the work, thus assuring abundant power to overcome the considerable static friction between the gripping elements of the chuck and the clamped work when releasing the latter.

Another object of the present invention is to protect the movable parts of the chuck from the oxidizing effect of cooling water which is flushing the clamped work while being operated upon.

This application is a division of our co-pending application Serial No. 635,316, filed September 29, 1932.

Further objects and advantages of the present invention will be apparent from the following description, reference being had to the accompanying drawings wherein a preferred embodiment of the present invention is clearly shown.

Figure 1:
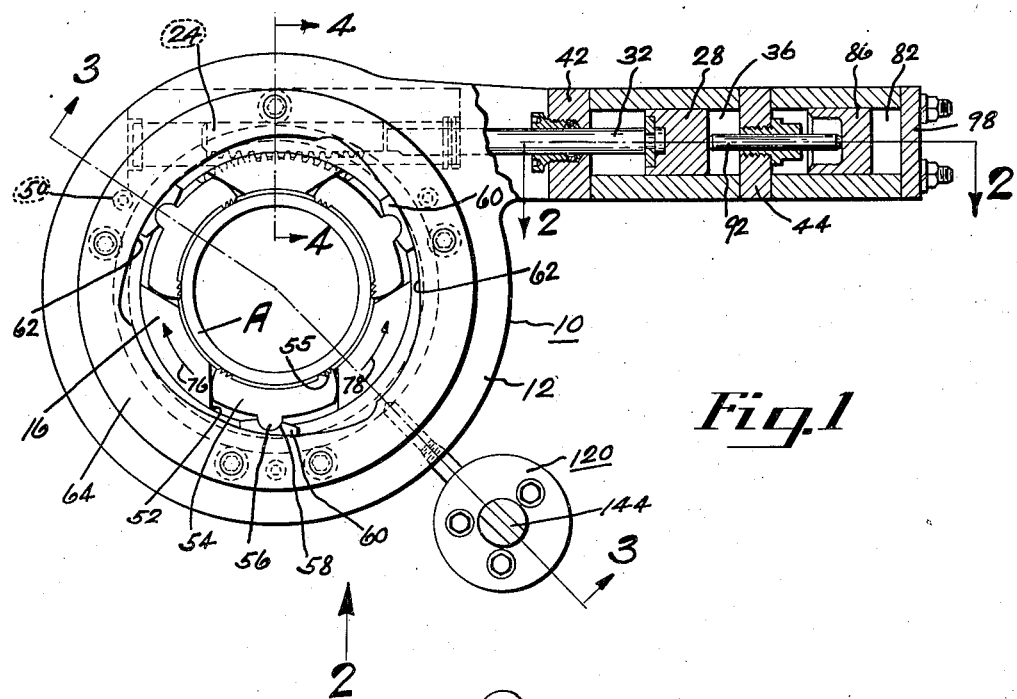
Fig. 1 is a plan view of a chuck embodying the present invention, certain parts thereof being shown in section.

Referring to the drawings, the chuck is generally designated by the reference numeral 10 and comprises a frame 12, having a cylindrical bore 14 which receives jaw carrying frames 16 and 18, having cylindrical peripheries in which gear segments 20 and 22, respectively, are cut. The gear segments 20 and 22 mesh with racks 24 and 26, respectively, of rods 32 and 34, respectively. These pistons 28 and 30 are slidable in cylinders 36 and 38, respectively, which are provided by an integral cylinder block 40, clamped between end plates 42 and 44 which are bolted to the chuck frame 12 in any suitable manner. Frame 16 is confined between frame 18 and a splash pan 46, and frame 18 is confined between frame 16 and a bottom plate 48, secured by screws 50 to frame 12. Each of the frames 16, 18 is provided with radial notches 52 each of which guides for radial movement a jaw 54, having teeth 55 for gripping a cylindrical workpiece A. A part roller-shaped portion 56 of each jaw 54 is received by a socket portion 58 of a glide shoe 60 which is adapted to engage with one of a plurality of camming surfaces 62, provided by cam rings 64 which are secured in any suitable manner to frame 12. The jaws 54 are normally urged into registry with the glide shoes 60 and the latter into engagement with the camming surfaces 62 by leaf springs 65 (see Fig. 3), attached with one end to the heads 66 of screws 68 which are threaded into the frames 16 and 18. The free ends of these leaf springs are received in V-shaped notches 70, provided by the jaws 54. Assisting the rather stiff leaf springs 65 in their function are a plurality of compression springs 72 which are seated in annular recesses 74 of the jaw carrying frames and urge the leaf springs 65 and therewith the jaws 54 in such direction that the glide shoes 60 are normally maintained in engagement with their respective camming surfaces 62. When the pistons 28, 30 move toward the right as viewed in Figs. 1 and 2, the frames 16 and 18 will rotate in the direction of arrow 76 in Fig. 1, thereby causing the glide shoes 60 to ride progressively toward those portions of the camming surfaces 62 which approach the center of the chuck. Such movement of the glide shoes 60 and associated jaws 56 results in a gripping of the workpiece A by the jaws 54. When the pistons 28, 30 move toward the left as viewed in Figs. 1 and 2, the frames 16, 18 will rotate in the direction of arrow 78 in Fig. 1, thereby causing the glide shoes 60 to ride progressively toward portions of the camming surfaces 62 which lead away from the center of the chuck whereupon the jaws 54 will recede from the workpiece A and permit the latter to descend by gravity to any desired destination.

Figure 2:
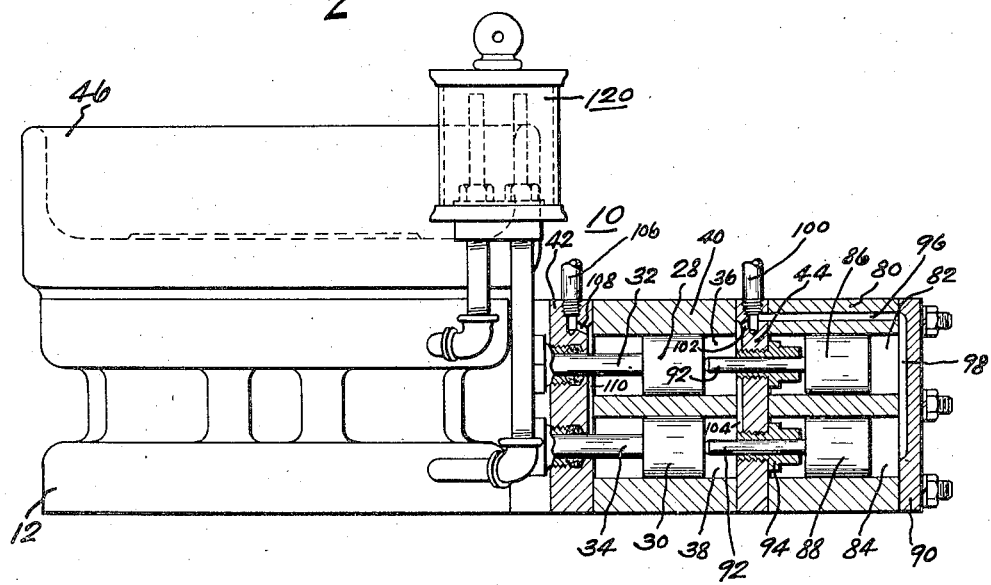
Fig. 2 is an elevation of the chuck looking in the direction of arrow 2 in Fig. 1, that part of Fig. 2 which is shown in section being taken on the line 2—2 of Fig. 1.

Since the frictional resistance, encountered between the glide shoes 60 and the camming surfaces 62 is a sliding friction, the coefficient of which is less than the coefficient of the static friction to be overcome before the frames 16, 18 can be rotated in a direction to effect release of a clamped workpiece, another cylinder block 80 is provided which comprises two cylinders 82 and 84 in axial alignment with cylinders 36 and 38, respectively. These cylinders 82 and 84 receive pistons 86 and 88 which are adapted to aid the pistons 28, 30 respectively, in their movement toward the left as viewed in Fig. 2 in order jointly to overcome the already mentioned considerable static friction between the glide shoes and their respective camming surfaces when undertaking to release a clamped workpiece. Cylinder block 80 is clamped between end-plate 44 and another end plate 90, the latter being bolted to cylinder block 40 in any suitable manner. The axially aligned pistons 28, 86 and 30, 88 are connectible for unitary movement by rods 92, passing through suitable stuffing boxes 94 which are threaded into the intermediate end wall 44. When fluid pressure, such as oil, is admitted to the cylinders 36 and 38 to move the pistons therein toward the left as viewed in Fig. 2, the same fluid pressure is also permitted to enter cylinders 82 and 84 through a duct 96 and a groove 98 whereby the pistons 86, 88 are also moved toward the left as viewed in Fig. 2 and by intermediation of the rods 92 assist the pistons 28, 30 in their movement in the same direction which results in the release of a clamped workpiece A. Fluid pressure is permitted simultaneously to enter the right-hand sides of the cylinders 36, 38 and 82, 84 as viewed in Fig. 2 through a pipe 100 which, as shown in Fig. 2, communicates with the right-hand sides of cylinders 82, 84 through the earlier mentioned duct 96 and groove 98 and with the right-hand sides of the cylinders 36, 38 through a duct 102 and a groove 104 in the intermediate end wall 44. Fluid pressure is admitted to the left-hand side of cylinders 36, 38 only through a pipe 106 which communicates with a duct 108 and a groove 110, provided by end plate 42. The pipes 100 and 106 may be conected to any conventional type valve (not shown) which is in communication with any suitable source of fluid pressure and which, while permitting fluid pressure to flow into pipe 106 and to the left-hand side of cylinders 36, 38, also permits venting of the right-hand sides of cylinders 36, 38 and 82, 84 through pipe 100, and vice versa. The operation of the conventional valve which may be manual or automatic and which controls the admission of fluid pressure to the cylinders does not form part of this invention, the explanations given with respect to the valve being sufficient for the full understanding of the function of the auxiliary pistons 86, 88.

Figure 3:
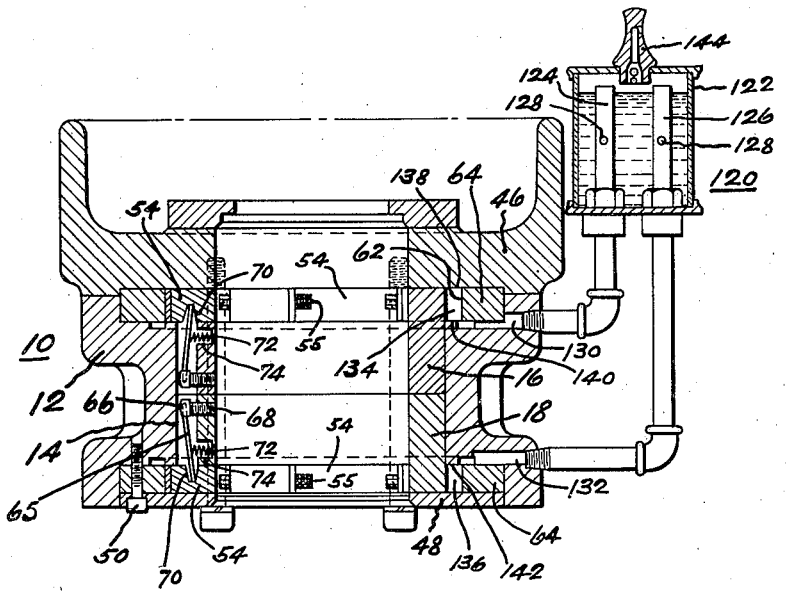
Fig. 3 is a section through the chuck taken on the line 3—3 of Fig. 1.
Figure 4:
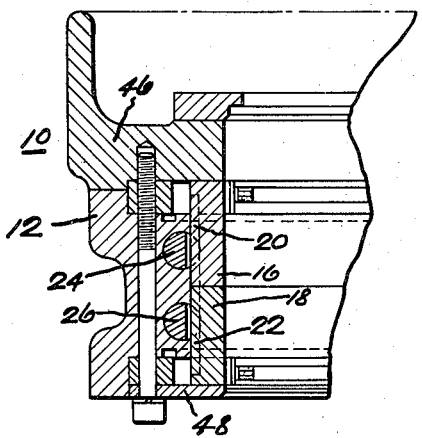
Fig. 4 is a fragmentary section taken on the line 4—4 of Fig. 1.

Referring particularly to Fig. 3, there is shown an oiler 120 which is adapted to lubricate the relatively sliding surfaces of the jaws 54, the frames 16, 18 and the camming surfaces 62, in order to prevent rusting of these surfaces under the influence of cooling water from the splash pan 46 into which water is continuously poured in order to flow from there past the workpiece A while being operated upon by a tool such as bits boring the interior of the workpiece. Extending into the oiler housing 122 are two tubes 124 and 126 each of which is closed on top and has an opening 128 in its cylindrical wall. These tubes 124, 126 extend through the housing 122 and are threaded into ducts 130 and 132 respectively, of bracket 12. The ducts 130 and 132 are in communication with annular chambers 134 and 136. Chamber 134 is formed by the camming surfaces 62 of one of the cam rings 64, the external surface of frame 16, the bottom surface 138 of splash pan 46 and the top surface 140 of bracket 12, while chamber 136 is formed by the camming surfaces 62 of the other cam ring 64, the external surface of frame 18, the plate 48 and the bottom surface 142 of bracket 12. The oil level in oiler 120 is supposed to be always above the tube openings 128 as illustrated. During radial movements of all jaws 54 toward the center of the chuck, the oil containing chambers 134 and 136 are enlarged, as can be readily understood, and additional oil from the oiler will recompense for the enlargement of these chambers. During the discharge of oil from the oiler to the chambers 134, 136, air is permitted to enter the oiler through a conventional check valve 144. During radial movement of the jaws 54 away from the center of the chuck, the oil in the chambers 134 and 136 and also in the oiler 120 is slightly compressed due to the fact that the air on top of the oil supply within oiler 120 cannot escape through check valve 144 and is slightly compressed. Some of the oil under pressure in the chambers 134, 136 will therefore, escape between the relatively sliding surfaces of the jaws 54 and the corresponding surfaces of the frames 16, 18 with every retracting stroke of the jaws as can be readily understood. Thus the cooling water has no access to the relatively sliding surfaces of the jaws and jaw carrying frames because there is a substantially permanent film of oil between these sliding surfaces. Equally important for a smooth operation and lasting usefulness of the chuck is the fact that the camming surfaces 62 are always in bodily contact with the oil in the chambers 134, 136, thereby appreciably reducing the static friction between the glide shoes 60 and their respective camming surfaces 62 while work is clamped by the jaws.

While the embodiment of the present invention as herein disclosed, constitutes a preferred form, it is to be understood that other forms might be adopted, all coming within the scope of the claims which follow.

We claim:

1. A chuck including clamping means, and power means for operating the clamping means, said power means including a plurality of fluid pressure operated pistons, all of them being operated to release clamped work and only part of them being operated to clamp work.

2. A chuck including clamping means, means including a plurality of pistons for operating the clamping means, two main fluid pressure conduits, a plurality of cylinders receiving the pistons, said cylinders having ducts which provide communication between the cylinders and the conduits in such manner that admission of fluid pressure to one of said conduits causes all pistons to be operated, and admission of fluid pressure to the other conduit causes a fewer number of pistons to be operated.

3. A chuck including clamping means, and fluid pressure operated means for actuating the clamping means, said fluid pressure operated means including a double acting and a single acting piston, and means for admitting fluid pressure to the single acting piston to cause the latter to assist the other piston in releasing clamped work.

4. A chuck including clamping means, fluid pressure operated means for actuating the clamping means, said fluid pressure operated means including a double acting and a single acting piston, and means for simultaneously admitting fluid pressure to both pistons whereupon the single acting piston assists the other piston in releasing clamped work, and for admitting fluid pressure to the double acting piston only to clamp work.

5. A chuck comprising, in combination, a body providing a cavity accessible through a plurality of slots in said body; a plurality of clamping jaws received and guided for movement to and from the work by said slots; and a lubricator above the level of the cavity and communicating with the latter so that said cavity is filled with lubricant, said lubricator including means for causing a restricted flow of lubricant only from the cavity to the lubricator when the jaws move in a direction whereby the cavity is reduced so that some lubricant leaks from the cavity through the relatively sliding surfaces of the jaws and guide slots and forms a film of lubricant between these surfaces.

6. A chuck comprising, in combination, a body providing a cavity accessible through a plurality of slots in said body; a plurality of clamping jaws received and guided for movement to and from the work by said slots; a lubricator above the level of the cavity and communicating with the latter so that said cavity is filled with lubricant; and a check valve on the lubricator permitting air to enter the latter when the cavity is enlarged during movement of the jaws in a certain direction, and preventing the discharge of air from said lubricator when the cavity is reduced during movement of the jaws in another direction so that the trapped air within the lubricator is compressed and causes lubricant to leak from the cavity through the relatively sliding surfaces of the jaws and guide slots forming a film of lubricant between said surfaces.

7. A chuck including clamping means, and a plurality of power operated means for actuating the clamping means, all of these actuating means being operative to release clamped work and only part of them being operative to clamp work.

8. A chuck including clamping means; and means for operating the clamping means, said operating means including a plurality of cylinders and pistons in tandem order and two fluid pressure conducting conduits, one of said conduits communicating with one end of one cylinder, and the other conduit communicating with the opposite end of said cylinder and with the corresponding end of the other cylinder.

9. A chuck including clamping means; and means for operating the clamping means, said operating means including a plurality of cylinders and pistons in tandem order and so arranged that a partition separates two successive cylinders and defines end walls for both cylinders, and two fluid pressure conducting conduits, one of said conduits communicating with one end of one cylinder, and the other conduit communicating with the opposite end of said cylinder and with the corresponding end of the other cylinder through ducts provided in the cylinders and merging into a single duct in the partition, said single duct being in direct communication with said other conduit.

JOHN Q. HOLMES.
LEO C. SHIPPY.